(12) United States Patent
Becher et al.

(10) Patent No.: US 12,296,554 B2
(45) Date of Patent: May 13, 2025

(54) LAMINATE

(71) Applicant: 3A COMPOSITES GMBH, Osnabrück (DE)

(72) Inventors: Christoph Becher, Singen (DE); Michael Mayer, Singen (DE)

(73) Assignee: 3A COMPOSITES GMBH, Osnabrück (DE)

( * ) Notice: Subject to any disclaimer, the term of this patent is extended or adjusted under 35 U.S.C. 154(b) by 328 days.

(21) Appl. No.: 17/782,298

(22) PCT Filed: Dec. 3, 2020

(86) PCT No.: PCT/EP2020/084471
§ 371 (c)(1),
(2) Date: Jun. 3, 2022

(87) PCT Pub. No.: WO2021/110837
PCT Pub. Date: Jun. 10, 2021

(65) Prior Publication Data
US 2023/0044998 A1    Feb. 9, 2023

(30) Foreign Application Priority Data
Dec. 4, 2019 (DE) .......................... 102019132953.1

(51) Int. Cl.
*B32B 15/08* (2006.01)
*B32B 5/02* (2006.01)
(Continued)

(52) U.S. Cl.
CPC .............. *B32B 15/08* (2013.01); *B32B 5/022* (2013.01); *B32B 7/12* (2013.01); *B32B 15/14* (2013.01); *B32B 27/12* (2013.01); *B32B 27/20* (2013.01); *B32B 2255/205* (2013.01); *B32B 2307/3065* (2013.01); *B32B 2307/732* (2013.01)

(58) Field of Classification Search
CPC ......... B32B 5/022; B32B 15/08; B32B 15/14; B32B 7/12; B32B 27/12; B32B 27/20; B32B 2255/205; B32B 2307/3065; B32B 2307/732; B32B 2250/05; B32B 2250/40;
(Continued)

(56) References Cited

U.S. PATENT DOCUMENTS 4,459,334 A   7/1984   Blanpied et al.
5,945,643 A   8/1999   Casser
(Continued)

FOREIGN PATENT DOCUMENTS

| CN | 105348641 A * | 2/2016 |
| EP | 3540145 A1 | 9/2019 |
| WO | 2013113734 A1 | 8/2013 |

OTHER PUBLICATIONS

Ip.com translation of CN105348641A (Year: 2024).*
(Continued)

*Primary Examiner* — Michael Zhang
(74) *Attorney, Agent, or Firm* — Bachman & LaPointe, P.C.

(57) ABSTRACT

The invention relates to a laminate (10; 10*a*) having a core (12) containing a thermoplastic polymer and having metal cover layers (16) disposed on either side of the core (12), each cover layer (16) being connected to the core (12) via an adhesive layer (14) having at least one polymer layer (15).

15 Claims, 5 Drawing Sheets

(51) Int. Cl.
*B32B 7/12* (2006.01)
*B32B 15/14* (2006.01)
*B32B 27/12* (2006.01)
*B32B 27/20* (2006.01)

(58) Field of Classification Search
CPC ........ B32B 2262/101; B32B 2262/105; B32B 2419/00
See application file for complete search history.

(56) References Cited

U.S. PATENT DOCUMENTS

| | | | |
|---|---|---|---|
| 2007/0207301 A1* | 9/2007 | Hanks | B32B 7/12 |
| | | | 428/292.1 |
| 2009/0155584 A1* | 6/2009 | Rolland | B32B 27/306 |
| | | | 428/339 |

OTHER PUBLICATIONS

3A Composites GmbH: ALUCOBOND® Product Information Transport & Industry, Sep. 2018, Singen Germany, http://media.alucobond.com/pdf/alucobond/alucobond_ti_Alucobond_TI_ProInfo_DE.pdf.
Wikipedia, Nov. 9, 2019, https://de.wikipedia.org/w/index.php?title=Glasfaser&oldid=193889238.
Wikipedia, Nov. 16, 2018, https://de.wikipedia.org/wiki/Schlichte_ (Production Technology).
Wikipedia, Nov. 26, 2019, https://de.wikipedia.org/w/index.php?title=Aluminium&oldid=194391710.
Wikipedia, Sep. 30, 2019, https://de.wikipedia.org/w/index.php?title=Nonwovens&oldid=192736040.
DE Search Report dated Aug. 27, 2020 issued for corresponding German Patent Application No. 102019132953.1.
International search report for PCT/EP2020/084471 dated Feb. 15, 2021.

* cited by examiner

Fig. 4a

| Product structure (symmetrical with respect to the core) | | Example 1 | Example 2 |
|---|---|---|---|
| | Cover layers | 0.5 mm aluminum sheet, alloy EN AW 5005A | 0.5 mm aluminum sheet, alloy EN AW 5005A |
| | Adhesive layer | Film 100 μm acid-functionalized EVA copolymer, Tm = 90 to 95 °C | Film 100 μm acid-functionalized EVA copolymer, Tm = 90 to 95 °C |
| | Non-woven fabric | None | Glass nonwoven 25 g/m² |
| | Core | 70 g/g-% ATH (D50 = 23 μm) 30 g/g-% blend of LLDPE (Tm = 95 to 115 °C) and EVA (Tm = 70 to 80 °C) Core calorific value: < 13 MJ/kg | 70 g/g-% ATH (D50 = 23 μm) 30 g/g-% blend of LLDPE (Tm = 95 to 115 °C) and EVA (Tm = 70 to 80 °C) Core calorific value: < 13 MJ/kg |
| Fire behavior | Initial mass of the core ($m_0$) | 306 | 244 |
| | Mass of fallen portion ($m_{drop}$) | 45 | 11 |
| | Quotient $m_{drop}/m_0$ | 0.147 | 0.045 |

Fig. 4b

| | | Example 3 | Example 4 |
|---|---|---|---|
| Product structure (symmetrical with respect to the core) | Cover layers | 0.5 mm aluminum sheet, alloy EN AW 5005A | 0.5 mm aluminum sheet, alloy EN AW 5005A |
| | Adhesive layer | Film 50 μm acid-functionalized EVA copolymer, Tm = 90 to 95 °C | Film 50 μm acid-functionalized EVA copolymer, Tm = 90 to 95 °C |
| | Non-woven fabric | None | Glass nonwoven 40 g/m² |
| | Core | 57 g/g-% calcium carbonate (400 to 500 μm) 13 g/g-% ATH (D50 = 12 μm) 22 g/g-% light filler (1 to 200 μm) 8 g/g-% acid-functional ethylene terpolymer Tm = 95 to 105 °C Core calorific value < 3 MJ/kg | 57 g/g-% calcium carbonate (400 to 500 μm) 13 g/g-% ATH (D50 = 12 μm) 22 g/g-% light filler (1 to 200 μm) 8 g/g-% acid-functional ethylene terpolymer Tm = 95 to 105 °C Core calorific value < 3 MJ/kg |
| Fire behavior | Initial mass of the core ($m_0$) | 312 | 306 |
| | Mass of fallen portion ($m_{drop}$) | 114 | 1 |
| | Quotient $m_{drop}/m_0$ | 0.365 | 0.003 |

Fig. 4c

| Product structure (symmetrical with respect to the core) | | Example 5 | Example 6 |
|---|---|---|---|
| | Cover layers | 0.5 mm aluminum sheet, alloy EN AW 5005A | 0.5 mm aluminum sheet, alloy EN AW 5005A |
| | Adhesive layer | Film 25 μm acid-functionalized EVA copolymer, Tm = 90 to 95 °C | Film 25 μm acid-functionalized EVA copolymer, Tm = 90 to 95 °C |
| | Non-woven fabric | None | Glass nonwoven 14 g/m² |
| | Core | 95 g/g-% ATH (D50 = 90 μm) 5 g/g-% MMA copolymer (Tg = 70 °C) Molecular weight 5000 to 10,000 g/mol Core calorific value < 1 MJ/kg | 95 g/g-% ATH (D50 = 90 μm) 5 g/g-% MMA copolymer (Tg = 70 °C) Molecular weight 5000 to 10,000 g/mol Core calorific value < 1 MJ/kg |
| Fire behavior | Initial mass of the core ($m_0$) | 324 | 348 |
| | Mass of fallen portion ($m_{drop}$) | 56 | 11 |
| | Quotient $m_{drop}/m_0$ | 0.173 | 0.032 |

LAMINATE

TECHNICAL FIELD

The invention relates to a laminate from which plate-shaped or panel-shaped elements used in particular in the field of interior and exterior coverings of walls of buildings can be produced.

BACKGROUND ART

A laminate called ALUCOBOND® is known from the applicant's product range. The known laminate consists of a core whose material comprises a thermoplastic polymer. The core is connected to a metal cover layer on either side via a respective adhesive layer, which comprises at least one polymer layer. The cover layer usually consists of an aluminum sheet having a thickness of typically no more than 1.0 mm.

In certain countries, the elements formed by the laminate are required to have a certain minimum fire resistance as per legal requirements when laminates of this kind are used for covering buildings. This minimum fire resistance means in particular that the spread of fire is delayed and no burning parts fall down or burning droplets are produced.

Furthermore, it is known from WO 2013/113734 A1 in connection with the use of thermosetting polymers as a material for the core of a laminate and the improvement of the fire resistance of the laminate for a non-woven fabric consisting of incombustible material to be used between the core and the metal cover layers, the fibers of the non-woven fabric having a melting range above the melting point of the material of the cover layers.

SUMMARY OF THE INVENTION

The laminate according to the invention, which comprises a core made of a thermoplastic polymer and has the features disclosed herein, has the advantage that it has an increased or improved fire resistance compared to the state of the art. In particular, the laminate according to the invention delays, reduces, or prevents a delamination of the cover layers or a sliding out of the core components in the event of a fire and thus a falling down or dripping of product components. In the event of a fire at the building, this serves to avoid or delay the spread of a building fire since secondary fires due to falling burning parts are prevented. Likewise, avoiding falling parts is elementary to the safe evacuation of the inhabitants of the building and the work of emergency personnel.

The invention is based on the idea of increasing the fire resistance of the laminate by interposing a non-woven layer consisting of flame-resistant fibers and by other specifications regarding the non-woven layer and its processing into the laminate.

In view of the explanations above, the teaching disclosed herein therefore proposes configuring the laminate in such a manner that the adhesive layer additionally contains a layer made of a non-woven fabric, the non-woven fabric consisting predominantly of incombustible fibers, the fibers having a melting range above the melting point of the material of the cover layers, the layer of non-woven fabric containing binder for strengthening the fibers or being thermally strengthened, in particular by an admixture of thermoplastic fibers, the layer of non-woven fabric having a coating or a sizing for increasing the adhesion to the at least one polymer layer of the adhesive layer, the core comprising fillers or/and short fibers, the filler content being between 60 wt % and 98 wt %, preferably more than 90 wt %, and the core having a calorific value of less than 15 MJ/kg, preferably less than 3 MJ/kg.

The use of binder in the layer of non-woven fabric or a thermal strengthening of the layer, in particular by admixing thermoplastic fibers, effects an improvement of the effect or the processing properties during the production of the laminate. According to the invention, it is also provided for the purpose of an improved adhesion of the layer of non-woven fabric to the polymer layer of the adhesive layer that the layer of non-woven fabric has a coating or a sizing for increasing the adhesion to the at least one polymer layer of the adhesive layer. Also, the core comprises fillers or/and short fibers in order to obtain the intended fire resistance, the filler content being between 60 wt % and 98 wt %, preferably more than 90 wt %, and the core having a calorific value of less than 15 MJ/kg, preferably less than 3 MJ/kg.

Advantageous embodiments of the laminate according to the invention are indicated herein and also in the dependent claims.

There are different options of how to arrange the layer made of the non-woven fabric in the area of the adhesive layer. According to a first advantageous embodiment, for example, the layer is disposed on the side of the adhesive layer facing the core. Thus, the core is protected directly by the non-woven layer.

Alternatively, the layer can be disposed between two polymer layers of the adhesive layer. Such an arrangement enables in particular an improved adhesion to the core or to the respective cover layer when producing the laminate and thus a particularly good or simple producibility of the laminate without any additional measures increasing the adhesion.

Preferably, such a layer made of the non-woven fabric has a mass per unit area between 10 $g/m^2$ and 90 $g/m^2$. Masses per unit area of this kind can be processed particularly well or simply using conventional technologies when producing the adhesive layers.

The layer of non-woven fabric can basically have both isotropic properties and anisotropic properties; preferably, the layer of non-woven fabric has isotropic properties.

Moreover, cover layers having a thickness between 0.2 mm and 1 mm are preferably provided.

There also are various options of how to connect the cover layers to the adhesive layer; particularly preferably, the cover layers have an oxidation layer or a pretreatment or/and a primer layer on the side facing the adhesive layer for improving the adhesion and the corrosion resistance.

Other advantages, features, and details of the invention are apparent from the following description of preferred embodiments of the invention and from the drawings.

BRIEF DESCRIPTION OF THE DRAWINGS

FIG. 4a to FIG. 4c show tables with comparisons of different laminates according to the state of the art and laminates equipped with a nonwoven which have been subjected to a fire test according to FIG. 3.

DETAILED DESCRIPTION

Identical elements are provided with the same reference signs in the Figures.

Figure 1:
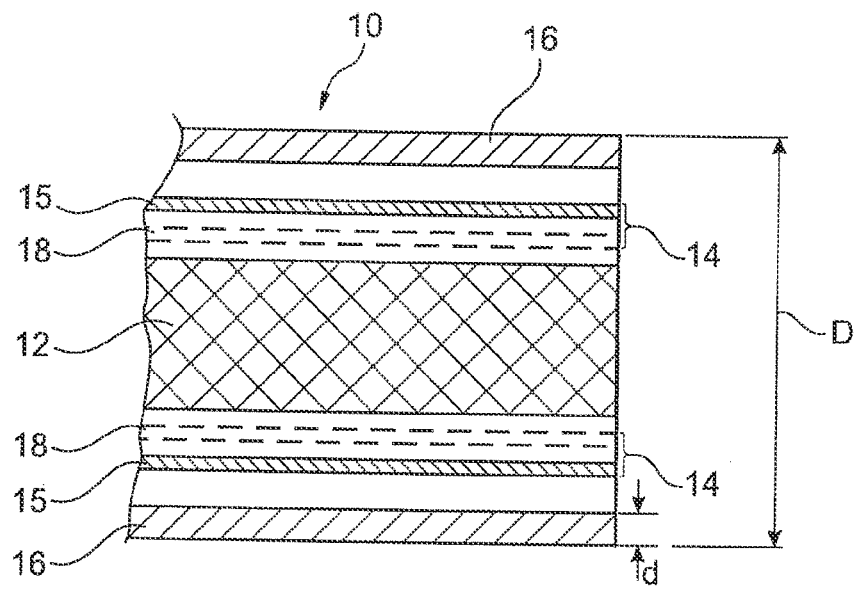
FIG. 1 shows a simplified cross section through the layer structure of a laminate, in which a layer made of a non-woven fabric is disposed on the side facing the core of the laminate, the individual layers of the laminate being disposed separately from each other for the sake of better visibility.

Laminate 10 illustrated in FIG. 1 serves as part of facade coverings or the like on buildings. To this end, laminate 10 can be formed into rectangular panel elements by downstream processing steps, such as cutting V-shaped grooves and folding, and said panel elements can be mounted on the outer facade of a building using suitable mounting systems.

Laminate 10, which has a total thickness D between 2 mm and 8 mm, particularly preferably between 3 mm and 6 mm, essentially consists of a core 12, which is connected to a metal cover layer 16 on either side via a respective adhesive layer 14.

Typically, laminates 10 are used as large-area elements having dimensions of 2.0 m×1.0 m to 2.0×8.0 m, for example, which means that the ratio of thickness D to area F is less than 2 mm/m².

Adhesive layer 14 consists in particular of polyethylene, polypropylene, polybutene, ethylene copolymers, such as an ethylene-vinyl acetate copolymer, an ethylene-acrylic acid copolymer, an ethylene-methacrylic acid copolymer, an ethylene-butyl acrylate copolymer, polystyrene, polyvinyl butyral, polyester, thermoplastic polyurethane, polyvinyl chloride, polyacrylates, and polymethacrylates, and their copolymers, blends, and reactive modifications, polyether sulfones, polyamide-imides, polyetherimides, or polyimides.

The two cover layers 16 can consist of, for example, aluminum, copper, zinc, titanium, steel, and their alloys, preferably of aluminum, and typically have a thickness d between 0.2 mm and 1.0 mm. Cover layers 16 can either be blank or surface-treated on their outer side, which faces away from core 12. As an example, the surface treatment can take place by painting, anodizing, sputtering, electroplating of layers, hot-dip galvanization, and/or plating. Furthermore, a thin anodic oxidation layer can be formed in addition to blank surfaces on the side of cover layer 16 facing adhesive layer 14 for improving the adhesion and the corrosion resistance or that cover layer 16 is provided with a pretreatment or/and a primer layer.

For example, polyurethane, polyester, epoxide, polysiloxane, polyacrylate, and its copolymers, polyvinyl acetal, or cellulose ether are used as a material for the primer layer.

In the embodiment example illustrated in FIG. 1, adhesive layer 14 comprises a single polymer layer 15, which can be applied to cover layer 16 by film lamination, extrusion coating, or roll or nozzle application, or to core 12 by co-extrusion. Overall, adhesive layer 14 has a mass per unit area of less than 1000 g/m².

In the embodiment example illustrated in FIG. 1, adhesive layer 14 is moreover connected to a layer 18 made of a non-woven fabric, which consists of, for example, short-fiber or endless-fiber non-woven fabrics, on the side facing core 12. Layer 18, i.e., the non-woven fabric, predominantly consist of incombustible fibers, such as A-glass, C-glass, E-glass, S-glass, T-glass, basalt fibers, or ceramic fibers having a melting range above the melting point of cover layer 16. Furthermore, layer 18 can contain small amounts of a binder for strengthening or be mechanically or thermally strengthened by, for example, the admixture of thermoplastic fibers. The thermoplastic fibers consist of polyethylene, polypropylene, polyester, or polyamide, for example.

When a binder is used, the binder can be based on urea/formaldehyde, melamine/formaldehyde, phenol/formaldehyde, furfuryl alcohol/formaldehyde, polyacrylates, or thermoplastic binders.

Layer 18, i.e., the non-woven fabric, has a mass per unit area between 10 g/m² and 90 g/m² and can consist of endless fibers or a mixture of individual fiber sections. The non-woven fabric, i.e., layer 18, can also have a coating or a sizing for improving the adhesive properties in relation to polymer layer 15 of adhesive layer 14.

Core 12 contains a thermoplastic polymer, which can be filled with inorganic fillers or/and short fibers.

When a thermoplastic polymer is used, core 12 consists of polyethylene, polypropylene, polybutene, polyvinyl chloride, polyvinylidene chloride, polystyrene, polyethylene terephthalate, polyamide, polysiloxane, polyoxymethylene, cellulose polymers, polyvinyl acetals, polyacrylates and polymethacrylates, polyether sulfones, polyamide-imides, polyimides, and copolymers, blends, functionalized polymers, graft polymers, or modifications thereof, for example.

The filler can consist of a material on an inorganic basis, such as aluminum hydroxide, magnesium hydroxide, calcium carbonate, light filler, such as hollow glass spheres, expanded glass, perlite, cenospheres, calcium borate, barium sulfate, hydrotalcite, red phosphorus, quartz sand, ammonium polyphosphate, talc, antimony trioxide, zinc hydroxystannate, zinc borate, boehmite, calcium hydroxide, nesquehonite, hydromagnesite, huntite, halloysite, kaolin, wollastonite, iron oxide-hydroxide, expanded graphite, layer silicates, or mixtures thereof, for example. Additionally, additives such as organophosphorus compounds, melamine, pigments, halogenated compounds, or stabilizers can be provided as well.

When short fibers are used in core 12, they consist of A-glass, C-glass, E-glass, S-glass, T-glass, R-glass, basalt fibers, or polymers, for example.

Particularly fire-resistant plate materials are characterized by core materials having a filler content between 60 wt % and 98 wt %, preferably more than 90 wt %, and have a calorific values of less than 15 MJ/kg, preferably less than 3 MJ/kg.

Figure 2:
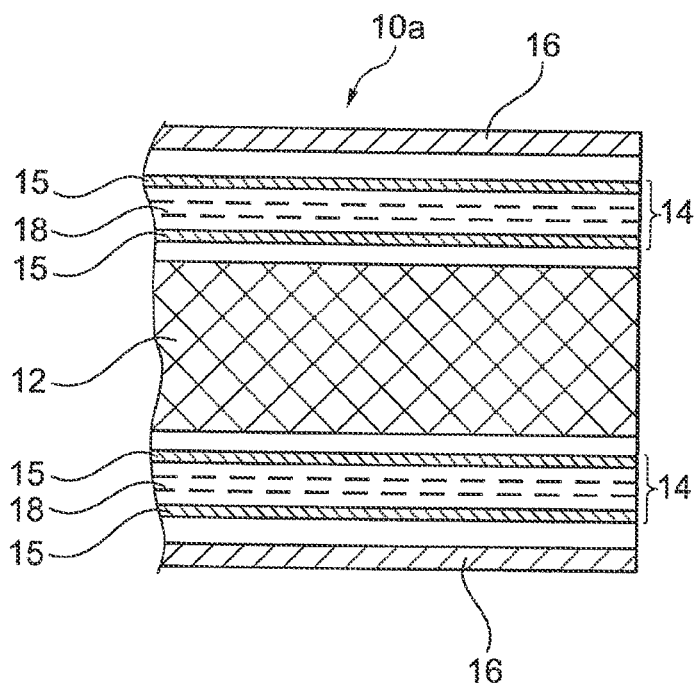
FIG. 2 shows a layer structure of the laminate which is modified compared to FIG. 1 and in which the layer made of the non-woven fabric is disposed between two polymer layers of an adhesive layer.

Laminate 10a illustrated in FIG. 2 differs from laminate 10 in that adhesive layer 14 comprises two polymer layers 15, between which layer 18 made of the non-woven fabric is embedded.

Figure 3:
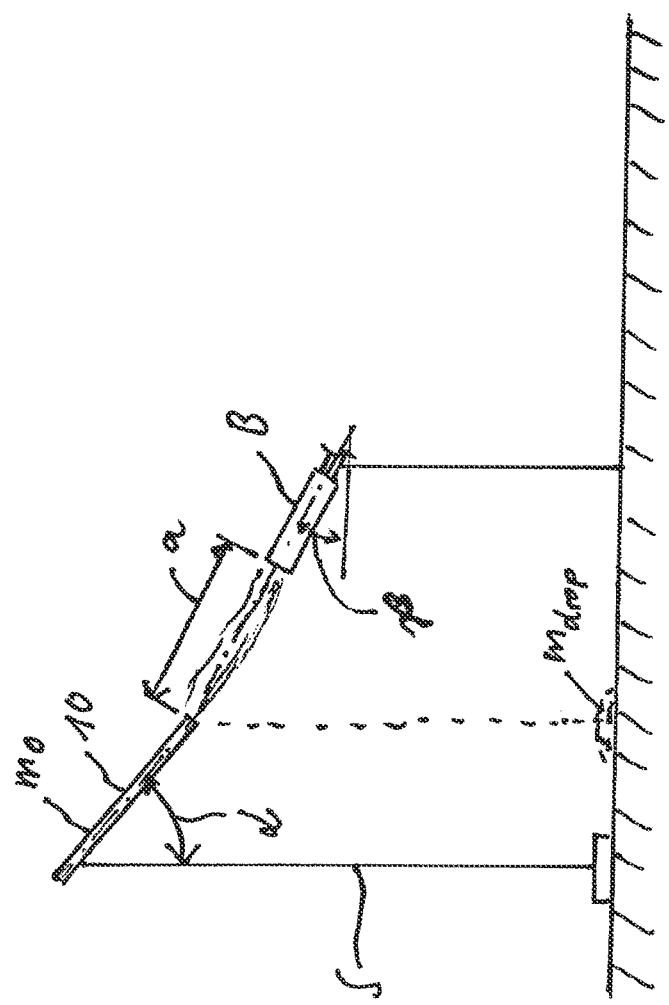
FIG. 3 is a simplified side view of the arrangement during the execution of a fire test.

FIG. 3 illustrates a test setup for carrying out a fire test by means of which the high fire resistance of laminates 10 configured according to the invention compared to laminates according to the state of the art has been proven. The test setup shows a laminate 10 of 20 cm×30 cm which is mounted on a support S at an angle α of 45° relative to the vertical. A burner head B of a propane gas burner (burner head made of stainless steel, 60 mm diameter) having a power of about 90 kW is disposed at a distance of 40 cm from the end face of laminate 10; the burner is operated for 4 min. Burner head B is directed at the center of the end face of laminate 10 and oriented at an angle β of 30° relative to the horizontal. Mass $m_0$ of core 12 was determined prior to the fire test; mass $m_{drop}$ of laminate 10 which had dropped during the fire test was determined after it had cooled.

With regard to the production of laminates 10 used for the fire tests, it is noted that their core mixtures were produced by mixing the components in a kneader at 180° C. and compressed into a 2.9 mm thick core plate at 180° C. and 20 bar. In a second step, laminate 10 was structured layer by layer from the individual layers, compressed in a press at 135° C. and 2 bar for 90 s, and cooled under pressure.

In the table according to FIGS. 4a to 4c, the results of the fire tests with laminates according to the state of the art (Examples 1, 3, and 5) and with laminates 10 according to the invention (Examples 2, 4, and 6), which are complemented with layers 18, which consist of non-woven fabric, are summarized.

The table shows that the use of nonwovens in the laminate structure according to the invention allows a significant reduction of falling parts, expressed as a quotient of the mass of fallen parts $m_{drop}$ relative to the invested mass $m_0$ of the core plate, to be achieved. Laminates 10 according to the invention are characterized by a quotient $m_{drop}/m_0$ of less than 0.1, preferably less than 0.05.

Thus described laminate 10, 10a can be altered or modified in various ways without departing from the idea of the invention. The latter consists in the use of an additional layer 18 made of a non-woven material in the area between core 12 with the respective cover layer 16 in adhesive layer 14, which connects core 12 to cover layer 16, for increasing the fire resistance of laminate 10, 10a.

REFERENCE SIGNS

10/a laminate
12 core
14 adhesive layer
15 polymer layer
16 cover layer
18 layer of non-woven fabric
D thickness of the laminate
d thickness of the cover layer
F area
S support
B burner head
a distance
$m_0$ mass
$m_{drop}$ mass
α, β angle

The invention claimed is:

1. A laminate (10; 10a) comprising a core (12) containing a thermoplastic polymer and having metal cover layers (16) disposed on either side of the core (12), the cover layers (16) each being connected to the core (12) via an adhesive layer (14) comprising at least one polymer layer (15), the adhesive layer (14) additionally containing a layer (18) made of a non-woven fabric, the non-woven fabric consisting mainly of incombustible fibers, the fibers having a melting range above the melting point of the material of the cover layers (16), the layer (18) of non-woven fabric containing binder for strengthening the fibers or being thermally strengthened, the layer (18) of non-woven fabric having a coating or a sizing for increasing the adhesion to the at least one polymer layer (15) of the adhesive layer (14), the core (12) comprising fillers or/and short fibers, the filler content being between 60 wt % and 98 wt %, the core (12) having a calorific value of less than 15 MJ/kg, the layer (18) being disposed either on the side of the adhesive layer (14) facing the core (12) or between two polymer layers (15) of the adhesive layer (14), and the layer (18) of non-woven fabric having a mass per unit area between 10 g/m² and 90 g/m².

2. The laminate according to claim 1, wherein
the laminate (10) has a thickness (D) between 2 mm and 8 mm.

3. The laminate according to claim 1, wherein
the cover layers (16) have a surface treatment in the form of a paint or an anodization on the side facing away from the core (12).

4. The laminate according to claim 1, wherein
the layer (18) of non-woven fabric has isotropic properties.

5. The laminate according to claim 1, wherein
the cover layers (16) are pretreated and/or have a primer layer on the side facing the adhesive layer (14).

6. The laminate according to claim 1, wherein
the cover layers (16) have a thickness (d) between 0.2 mm and 1.0 mm.

7. The laminate according to claim 1, wherein
the non-woven fabric consists of A-glass, C-glass, E-glass, S-glass, T-glass, basalt fibers, or ceramic fibers.

8. The laminate according to claim 1, wherein
the adhesive layer (14) comprises a single polymer layer (15), which is applied to the cover layer (16) by film lamination or extrusion coating.

9. The laminate according to claim 1, wherein
the laminate (10) has a format with a width and a length between 2.0 m×1.0 m and 2.0 m×8.0 m, and that the ratio between the thickness (D) and the area (F) of the laminate (10) is less than 2 mm/m².

10. The laminate according to claim 1, wherein
after a fire test using a gas burner having a power of more than 50 kW, the ratio of the mass ($m_{drop}$) of the portions which have fallen down because of the fire test to the initial mass ($m_0$) of the core (12) is less than 0.1.

11. The laminate according to claim 1, wherein the layer (18) of non-woven fabric being thermally strengthened by an admixture of thermoplastic fibers.

12. The laminate according to claim 1, wherein the filler content is more than 90 wt %.

13. The laminate according to claim 1, wherein the core (12) has a calorific value of less than 3 MJ/kg.

14. The laminate according to claim 2, wherein the thickness (D) is between 3 mm and 6 mm.

15. The laminate according to claim 10, wherein the ratio is less than 0.05.

* * * * *